A. A. HILL, DEC'D.
A. B. HILL, EXECUTRIX.
BREAD TOASTER.
APPLICATION FILED DEC. 4, 1917.

1,297,848.

Patented Mar. 18, 1919.
2 SHEETS—SHEET 2.

WITNESSES:

INVENTOR.
Arthur A. Hill Dec'd
Agnes Blanche Hill Executrix.
By
Rosenbaum, Stockbridge & Borst
ATTORNEYS.

UNITED STATES PATENT OFFICE.

ARTHUR A. HILL, DECEASED, LATE OF NEW YORK, N. Y., BY AGNES BLANCHE HILL, EXECUTRIX, OF NEW YORK, N. Y.

BREAD-TOASTER.

1,297,848.   Specification of Letters Patent.   Patented Mar. 18, 1919.

Application filed December 4, 1917. Serial No. 205,346.

*To all whom it may concern:*

Be it known that ARTHUR A. HILL, deceased, late a citizen of the United States, residing at the city of New York, in the borough of Manhattan and State of New York, invented certain new and useful Improvements in Bread-Toasters, of which the following is a full, clear, and exact description.
This invention relates to bread toasters and more particularly to the type of toaster in which a number of slices of bread are mounted in carriers attached to an endless belt.
One of the objects of this invention is to provide a toaster of this character which is entirely electrical in its operation, the motive power and the heat for toasting the bread being both supplied by electric current, thereby providing a machine which may be readily controlled to insure the production of a uniform grade of toast.

Another object of the invention is to provide a carrier for the slices of bread which is shaped so that it will not cause the burning of the edges of the slice of bread or other portions in contact with the metallic parts of the carrier.

A further object of the invention is to provide a feed device by means of which the slices of toast may be automatically fed to the carriers and discharged therefrom when completely toasted.

With these and other objects in view the invention consists of the constructions and combinations which will be hereinafter set forth in conjunction with the accompanying drawings and will be particularly pointed out in the appended claims.
In the drawings:

Figure 3:
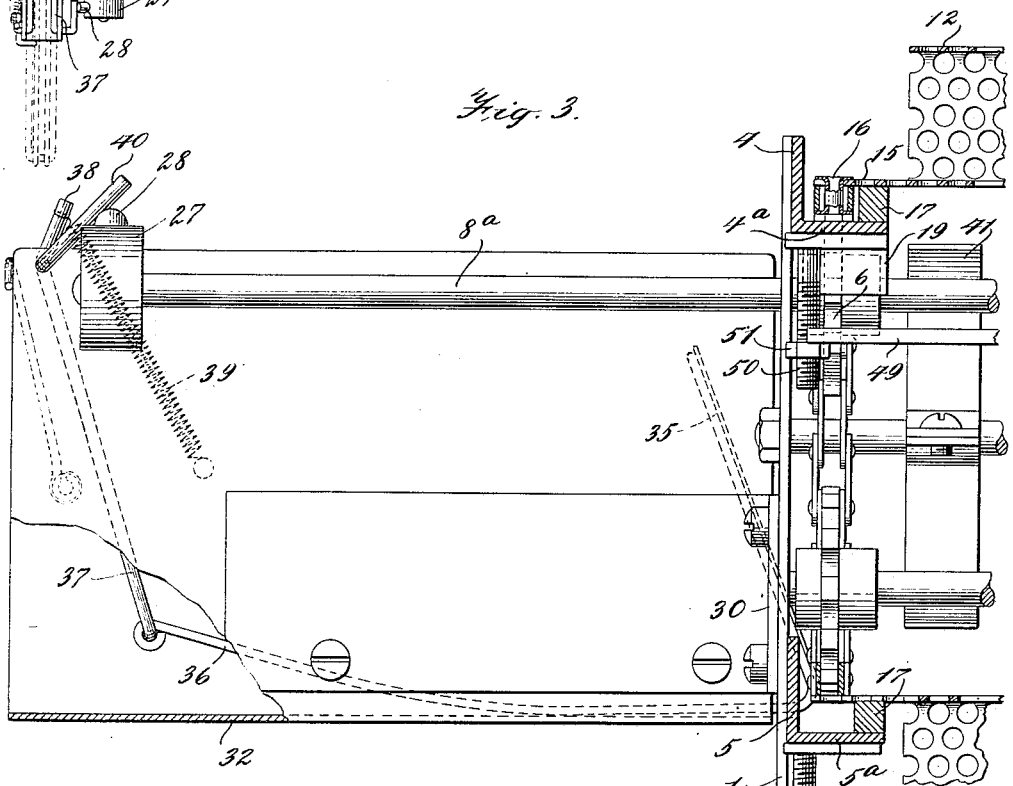
Fig. 3 is an enlarged detail showing the feed mechanism.

The bread toaster may be mounted upon any suitable support and in the embodiment shown, a frame work is shown consisting of four standards 1 which are secured together adjacent their bottoms by longitudinal cross struts 2 and also by a shelf 3. The upper ends of the standards are also secured together by longitudinal cross struts 4 and 5 which are secured to the inner faces of the standards. These cross pieces 4 and 5 are preferably angle irons having their legs $4^a$ and $5^a$ extending inwardly as shown in Fig. 3. The standards are also supported at their tops and bottoms by transversely extending cross rods 7 indicated in Fig. 1. Axles 8 positioned just above and beneath the cross pieces 5 and 4, respectively, at each end of the frame are rotatably mounted in the standards 1. Each of these axles carry a pair of sprocket wheels 9 which are secured to the axles adjacent the standards. An endless chain 10 travels over each set of sprocket wheels and mounted between them are carriers 12 for the slices of toast, the chains and carriers thus constituting an endless belt or conveyer.

Each of the carriers 12 is formed from perforated sheel metal which is fashioned to provide a rectangular frame having open ends. The central portions of the top and bottom faces of the corner are also open so that these faces consist of marginal flanges 13. The flanges constituting the bottom face of each rectangular frame carry lugs 15 which are fastened to the chain by means of eyelets 16 as is disclosed in Fig. 3, the carriers being disposed along the chain at only short intervals apart. Mounted upon the legs $4^a$ and $5^a$ of the angle irons 4 and 5 are tracks 17 having smooth faces upon which the lugs or ears 15 are adapted to slide as the endless conveyer is moved. These tracks extend substantially the entire length of the pieces 4 and 5 and have their ends curved as at 19 to permit the lugs 15 to readily mount and leave the tracks. By this construction the chain is precluded from scraping along the face of the legs $4^a$ and $5^a$ and thus the friction which would be therefore caused eliminated. To add additional rigidity to the carriers, tie wires 20 may be used.

Figure 1:
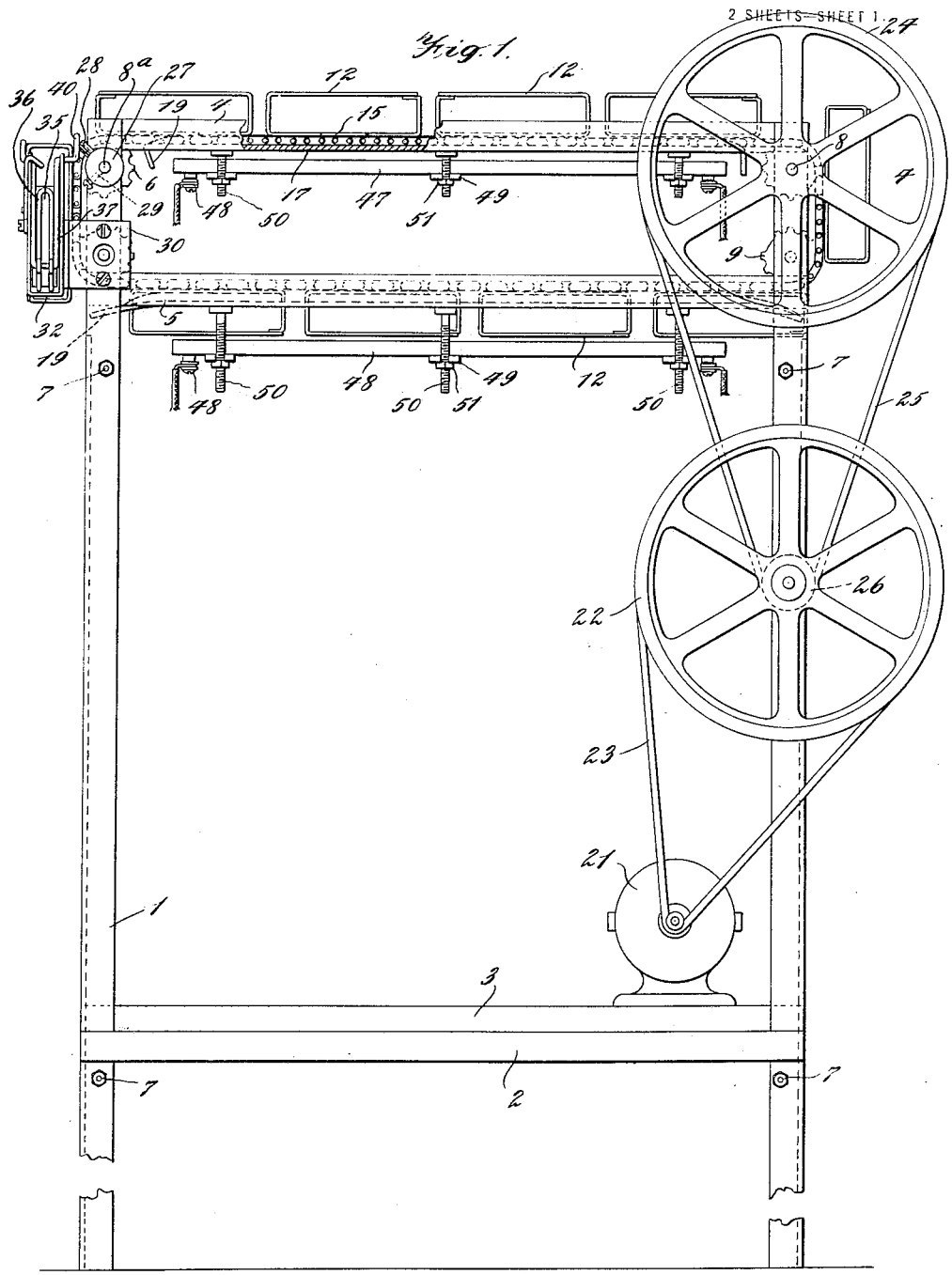
Figure 1 shows in side elevation a bread toaster constructed in accordance with the principles of the invention.

The endless conveyer is actuated by means of the transmission disclosed in Fig. 1 which comprises a small electric motor 21 which drives a pulley 22 by means of a belt 23. A pulley 24 mounted at one end of one of the axles 8, is driven through a belt 25 and a small pulley 26 mounted upon the shaft carrying the pulley 22. The speed reduction which is thereby obtained is sufficient to permit a small high speed electric motor to be utilized as the motive power.

Referring now to the feed mechanism by means of which the slices of toast are placed within the carriers and discharged therefrom. In Fig. 3 of the drawing this mechanism is shown in detail. One of the axles 8 which carries a pair of the sprocket wheels is extended a considerable distance beyond the frame and is indicated 8ª in Fig. 3. At the end of this extension is mounted a cam 27 comprising a hub having a pin 28 projecting therefrom. The cam is preferably adjustable upon the axle 8 by means of a set screw 29 disclosed in Fig. 1. Carried by an L-shaped bracket 30 which is secured to one of the standards 1 is a U-shaped frame 32 which is of a size to receive a slice of toast, or in other words, of substantially the same size as one of the carriers 12. This U-shaped frame or feed hopper is disposed so that as the conveyer is moved, the carriers will be successively brought into alinement therewith so that a slice of bread placed within the U-shaped feed hopper may be discharged directly into one of the carriers, and if the carrier is filled with a toasted slice of bread, the act of emplacing the fresh slice within the carrier will cause the toasted slice to be discharged. The slice of bread within the feed hopper 32 is slid into the carrier by a reciprocating pusher-arm 35 which is mounted upon a pair of links 36 connected to a pair of bell crank levers 37. One of these bell crank levers has secured to the short arm 38 thereof a spring 39. The other bell crank lever has its short arm 40 arranged in the path of the pin 28 so that as the axle 8ª is rotated the engagement of the pin 28 with the arm 40 will oscillate the bell crank levers 37 which will, through the links 36, also cause the pusher-arm 35 to move forwardly, as is disclosed in Fig. 3. After the pin has moved out of engagement with the arm 40, the spring 39 retracts the pusher-arm 35 so that a fresh slice of bread may be placed within the U-shaped feed hopper 32. In order to hold the carrier rigidly in alinement with the feed hopper 32, guides 40' and 41 are preferably provided against which the carriers successively rest when in alinement with the feed hopper. These guides are preferably slightly curved at their ends so as to permit the carriers to change from their vertical to horizontal position.

Figure 2:
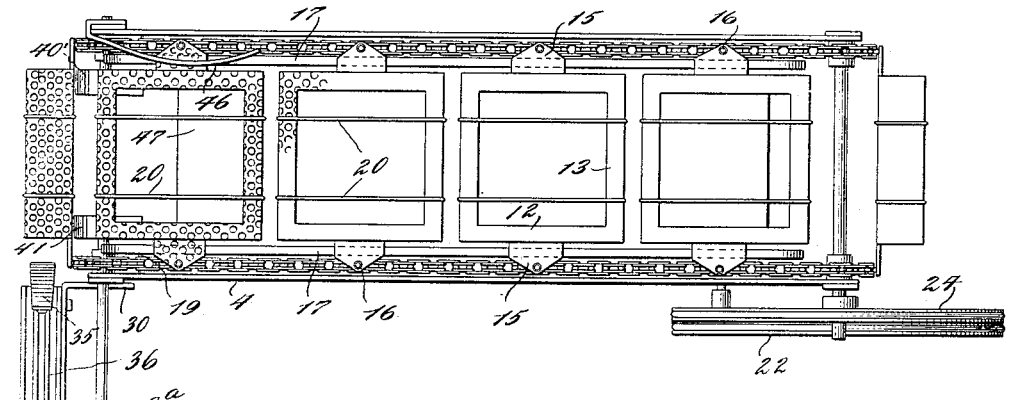
Fig. 2 is a plan view thereof; and

As is evident the slices of bread may not be of uniform size and for this reason the length of the stroke of the arm 35 is made sufficient to insure that the smaller slices of bread will be correctly placed within the carrier. The larger slices may therefore be projected too far through the opposite end of the carrier and for this reason a guide 46 is provided which is secured to one of the cross pieces 4, which guide will, as a carrier passes out of alinement with the feed hopper, engage the projecting end of the slice of bread and move it back to its correct position within the carrier. This guide is clearly shown in Fig. 2.

The heat for toasting the bread is supplied by two hot plates 47 and 48, which plates preferably consist of the usual electric hot plate containing a resistance (not shown) so that when electric current is passed through the plates will soon become heated to the desired temperature. The terminals for the electric wires are as shown at 48' which wires, as is well understood, should be connected to any suitable source of electric energy. The hot plates 47 and 48 are preferably mounted upon cross pieces 49 which fit loosely over threaded studs 50 depending from the cross pieces 4 and 5. The cross pieces 49 are held in position by means of nuts 51 which may be adjusted to vary the distance from the surface of the hot plates to the carrier.

The operation will be obvious from the preceding description, but will now be briefly described. The hot plates 47 and 48 are first brought to the proper temperature by passing an electric current through them in the usual manner. The motor 21 is then started, and the pulleys rotating in the direction of the arrows cause the carriers to be brought one after the other into alinement with the feeding mechanism. The operator standing adjacent to the feeding mechanism places a slice of bread within the feed hopper 32 and as one of the carriers comes into alinement with the feed hopper, the rotating pin 28 will cause the pusher-arm to move forwardly and place the slice of bread within the carrier. The pusher-arm 35 is then retracted by means of the spring 39 and a fresh slice of bread placed within the hopper, which slice will then be emplaced within the next carrier brought into alinement with the feed hopper. The carriers of the endless conveyer are in this way completely filled with slices of bread and as the carriers are brought successively over the hot plates 47 and 48, both sides of the slice of bread will be toasted to an even brown. In practice it has been found desirable to permit a slice of bread to pass over the hot plates several times in order to insure a uniform toast. The toasted slices are then discharged from the carriers and fresh pieces placed within the carriers by means of the feed mechanism described, since it is obvious that the act of emplacing a fresh slice of bread within a carrier will discharge the toasted slice from the opposite end thereof where it may drop into any suitable receptacle, not shown.

It has also been found in practice that the particular shape of the carrier is of importance, since the edges of the slices of bread are protected by the perforated carrier which will prevent them from being burned, the radiation of heat from the metallic portions of the carrier being sufficient for its purpose. The fact that the carrier is of perforated material, however, permits sufficient heat to reach the edges of the bread to insure their being toasted the proper amount without burning.

I claim:

1. In a bread toaster, the combination of carriers for slices of bread each comprising a perforated cage, having two opposite sides open for the introduction and removal of the slices of bread, the other sides being closed to protect the edges of the slices of bread from burning, and means to move said carriers relatively to a source of heat.

2. A carrier for supporting slices of bread comprising a perforated cage having two opposite sides open for the introduction and removal of the slices of bread, the other sides being closed to protect the edges of the slices of bread from burning.

3. In a bread toaster, the combination with an endless conveyer and a plurality of carriers attached thereto, of electrically heated plates arranged beneath the upper and lower stretches of the conveyer, means for feeding slices of bread to the carriers comprising a feed hopper, a pusher arm in said hopper, and means actuated by the conveyer for operating the pusher arm.

4. In a bread toaster, an endless conveyer having open ended carriers for the slices of bread and a guide arranged adjacent one side of the conveyer adapted to engage the slices of bread projecting beyond the ends of the open ended carriers.

5. In a bread toaster, an endless conveyer having a plurality of open ended carriers for the slices of bread, means for revolving the conveyer, means actuated by the conveyer for automatically feeding the slices of bread to said carriers through the open ends thereof while said conveyer is in motion, and a guide arranged adjacent one side of the conveyer adapted to engage and reposition slices of bread projecting beyond the ends of the carriers.

6. In a bread toaster of the type in which an endless conveyer is provided with a plurality of carriers, means for feeding slices of bread to the carriers comprising a feed hopper, a pusher-arm in said hopper, and means actuated by the conveyer for operating the pusher-arm.

7. In a bread toaster of the type in which an endless conveyer is provided with a plurality of carriers, means for feeding slices of bread to the carriers comprising a feed hopper, a pusher-arm in said hopper, a pair of bell-crank levers attached to said pusher-arm, and means for operating said bell-crank levers.

8. In a bread toaster of the type in which an endless conveyer is provided with a plurality of carriers, means for feeding slices of bread to the carriers comprising a feed hopper, a pusher-arm in said hopper, a pair of bell-crank levers attached to said pusher-arm, and a rotating spindle provided with a cam for actuating said bell-crank levers.

In witness whereof, I hereunto subscribe my signature.

AGNES BLANCHE HILL,
*Executrix of Arthur A. Hill, deceased.*